United States Patent
Morgan et al.

(10) Patent No.: US 7,087,129 B2
(45) Date of Patent: Aug. 8, 2006

(54) METHOD OF FORMING AN IMPREGNATED MICRO-FIBER FILTRATION UNIT

(75) Inventors: H. William Morgan, Michigan City, IN (US); Gunther E. Asterlin, South Bend, IN (US)

(73) Assignee: Filter Specialists International, Inc., Michigan City, IN (US)

(*) Notice: Subject to any disclaimer, the term of this patent is extended or adjusted under 35 U.S.C. 154(b) by 383 days.

(21) Appl. No.: 10/664,309

(22) Filed: Sep. 17, 2003

(65) Prior Publication Data

US 2004/0112511 A1   Jun. 17, 2004

Related U.S. Application Data

(63) Continuation-in-part of application No. 10/214,407, filed on Aug. 6, 2002, now Pat. No. 6,921,448, which is a continuation of application No. 09/627,985, filed on Jul. 28, 2000, now abandoned.

(51) Int. Cl.
*B32B 31/00* (2006.01)

(52) U.S. Cl. ............... 156/167; 156/169; 156/173; 156/184; 156/185; 156/187; 156/191; 156/276

(58) Field of Classification Search ............... 156/167, 156/169, 173, 184, 185, 187, 191, 276

See application file for complete search history.

(56) References Cited

U.S. PATENT DOCUMENTS

| | | | |
|---|---|---|---|
| 3,251,475 A | 5/1966 | Till | |
| 3,755,527 A | 8/1973 | Keller | |
| 3,816,304 A | 6/1974 | Wallis | |
| 3,870,567 A | 3/1975 | Palmer | |
| 3,904,798 A | 9/1975 | Vogt | |
| 3,971,373 A * | 7/1976 | Braun | 128/206.19 |
| 3,972,759 A | 8/1976 | Buntin | |
| 3,978,185 A | 8/1976 | Buntin | |
| 4,240,864 A | 12/1980 | Lin | |
| 4,726,901 A | 2/1988 | Pall | |
| 4,902,427 A | 2/1990 | Szczepanik | |
| 5,039,413 A | 8/1991 | Harwood | |
| 5,122,270 A | 6/1992 | Ruger | |
| 5,149,468 A | 9/1992 | Hershelman | |
| 5,269,921 A | 12/1993 | Ruger | |
| 5,338,340 A | 8/1994 | Kasmark | |
| 5,389,166 A | 2/1995 | White | |
| 5,506,041 A * | 4/1996 | Tanaka et al. | 428/219 |
| 5,679,251 A | 10/1997 | Swanson | |
| 6,921,448 B1 * | 7/2005 | Morgan | 156/167 |
| 2003/0024871 A1 * | 2/2003 | Morgan | 210/450 |

FOREIGN PATENT DOCUMENTS

DE     4016348 A1 * 11/1991

* cited by examiner

*Primary Examiner*—Jeff H. Aftergut
(74) *Attorney, Agent, or Firm*—Botkin & Hall, LLP

(57) ABSTRACT

A method of forming a blown micro-fiber filtration unit having multiple overlapping layers of fibrous material and an active material applied over said layers, The fibrous material layers being fused together.

2 Claims, 4 Drawing Sheets

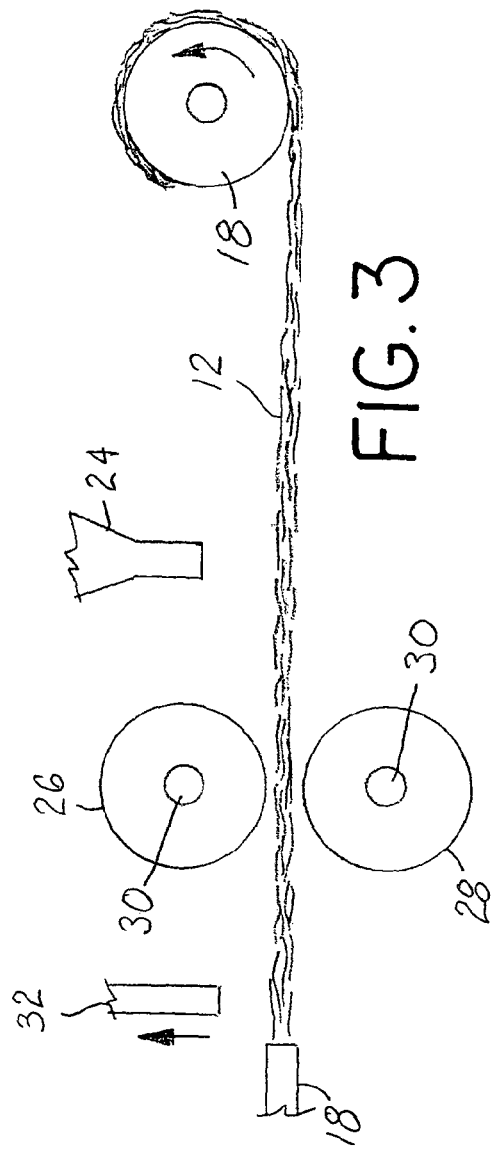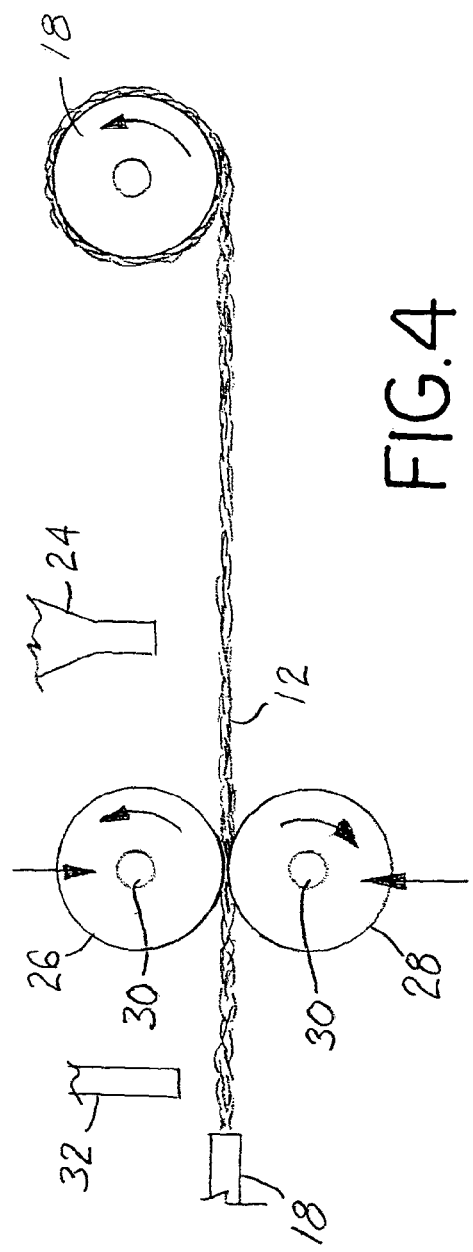

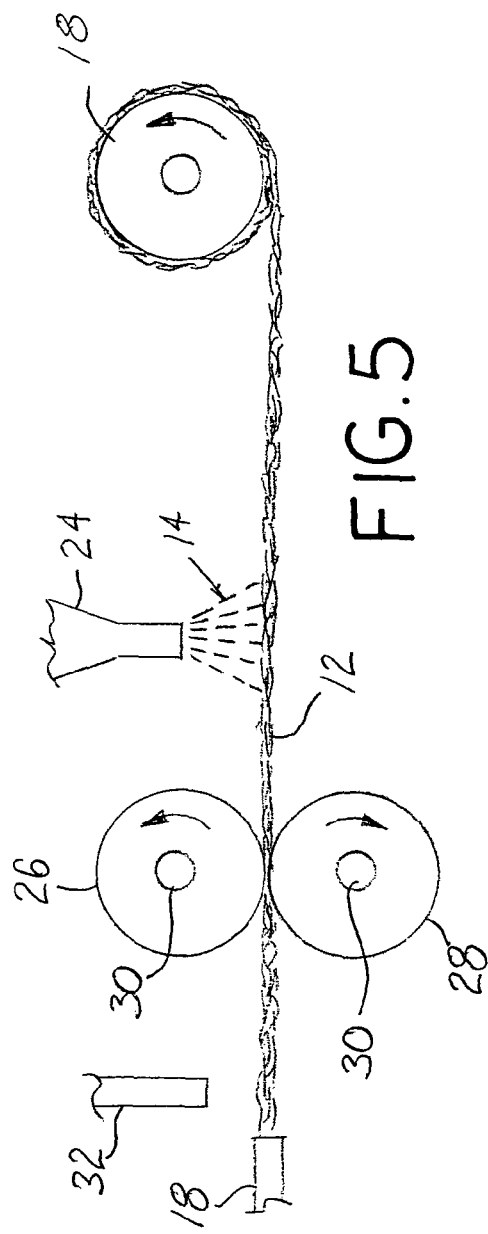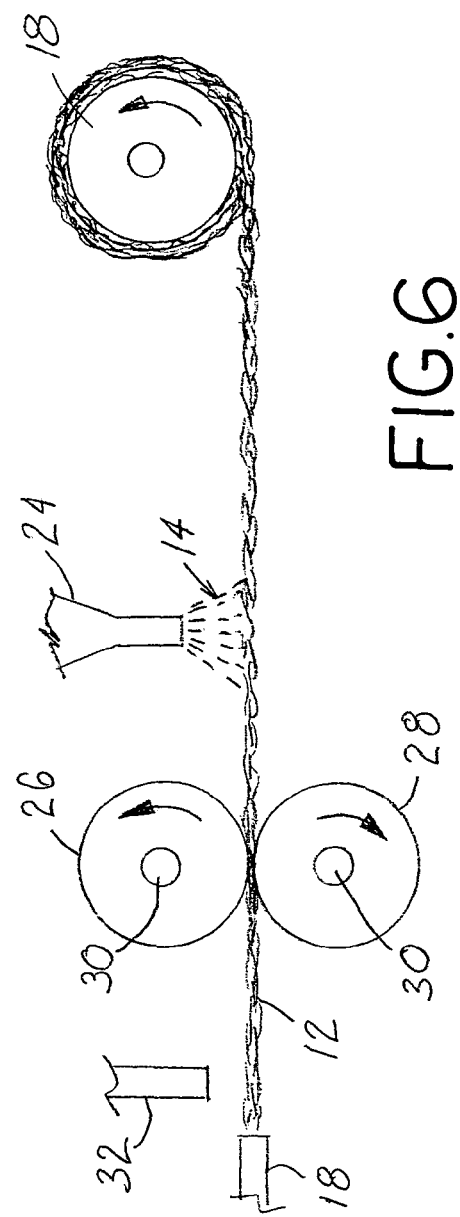

METHOD OF FORMING AN IMPREGNATED MICRO-FIBER FILTRATION UNIT

CROSS REFERENCE TO RELATED APPLICATIONS

This application is a continuation-in-part of non-provisional U.S. patent application Ser. No. 10/214,407, field 6 Aug. 2002, now U.S. Pat. No. 6,921,448, which was a continuation of non-provisional U.S. patent application Ser. No. 09/627,985, filed 28 Jul. 2000, now abandoned.

SUMMARY OF THE INVENTION

This invention relates to a filtration unit and will have a particular application to the process of forming a micro-fiber unit of cartridge or bag design having overlapping layers of fibrous material with an active material applied between the layers.

As disclosed in U.S. Pat. Nos. 3,816,304; 4,902,427; 5,149,468; 5,389,166; and 5,679,251 filtration units have been manufactured in which an active material has been inter-dispensed within the fibrous material. Filtration units of blown micro-fiber material formed into either cartridges or filter bags are economical and extremely efficient. An example of such units is disclosed in U.S. Pat. No. 4,983,292; incorporated herein by reference. It is also known to dispense the active material directly onto the fibrous material during the melt blowing process. Such active material is generally introduced in powdered or small granular form. One difficulty with the known methods, however, is that when said active material is introduced into the stream of blown micro-fiber, the air stream used to eject the micro-fibers also disperses the active material, essentially preventing it from being deposited upon the strands of blown fiber in a controlled manner.

In one aspect of this invention, it was discovered that if one diverted in a lateral direction the flow of the fibrous material, the air flow would be interrupted thus permitting the active material to be deposited upon the strands of material prior to reaching the mandrel upon which the filtration unit is formed. In this manner the active material is sandwiched between layers of strands of the fibrous material which are fused together, retaining the active material within the formed filtration unit.

In another aspect of the invention, the air stream from the melt blowing process is interrupted medially between the blow nozzle and the winding mandrel. Active material is deposited onto the passing strands of molten base material on the lee side of the interruption. In this manner, the active material—even of very fine composition—may be deposited onto the passing strands in a controlled manner.

Accordingly, it is an object of this invention to provide a method of forming a micro-fiber blown filtration unit having layered active material.

Another object of this invention is to provide a method of producing a micro-fiber blown filtration unit formed with fine active material.

BRIEF DESCRIPTION OF THE DRAWINGS

These and other objects and aspects of this invention will become apparent upon a reading of the following description, accompanied by the drawings wherein:

FIG. 3 is a side view showing a first step of the filtration unit of FIG. 1 being formed by a second process;

FIG. 4 is a side view showing a second step of the second process of FIG. 3;

FIG. 5 is a side view showing a third step of the second process of FIG. 3;

FIG. 6 is a side view showing a fourth step of the second process of FIG. 3; and, FIG. 7 is a side view showing a fifth step of the second process of FIG. 3.

DETAILED DESCRIPTION OF THE PREFERRED EMBODIMENTS

Figure 1:
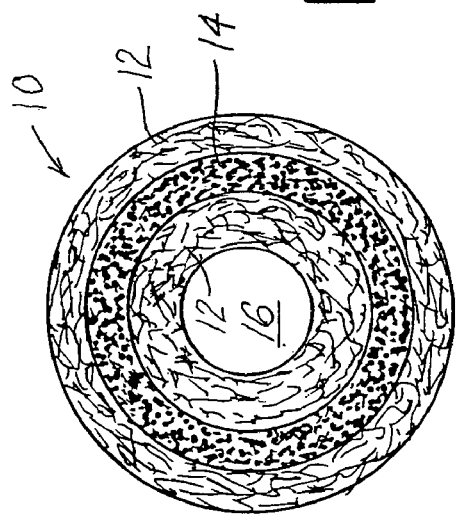
FIG. 1 is a cross-sectional view of the filtration unit showing the active material layered within the unit.

Filtration unit 10, shown in cross-section view in FIG. 1, includes multiple overlapping fused layers of base material 12 within which in layered form is an active material 14. Unit 10 is illustrated in the drawings is of cylindrical form and is known in the trade as a cartridge filter. It is to be understood, though, that this invention would have application also to bag type filters. Unit 10 has an open core 16. The outer most and inner most layers of unit 10 are preferably formed only of the base material so as to form a seal for the active material 14, which is interspersed within or sandwiched between layers of the base material within the central portions of the unit. Base material 12 is preferably blown micro-fiber such as polypropylene. Active material 14 may constitute a variety of chosen substances depending upon the intended use of the filtration unit such as for irrigation and fertilization purposes, sterilization purposes, or cleansing purposes. For example, for water filtration, the active material may be carbon particles.

Figure 2:
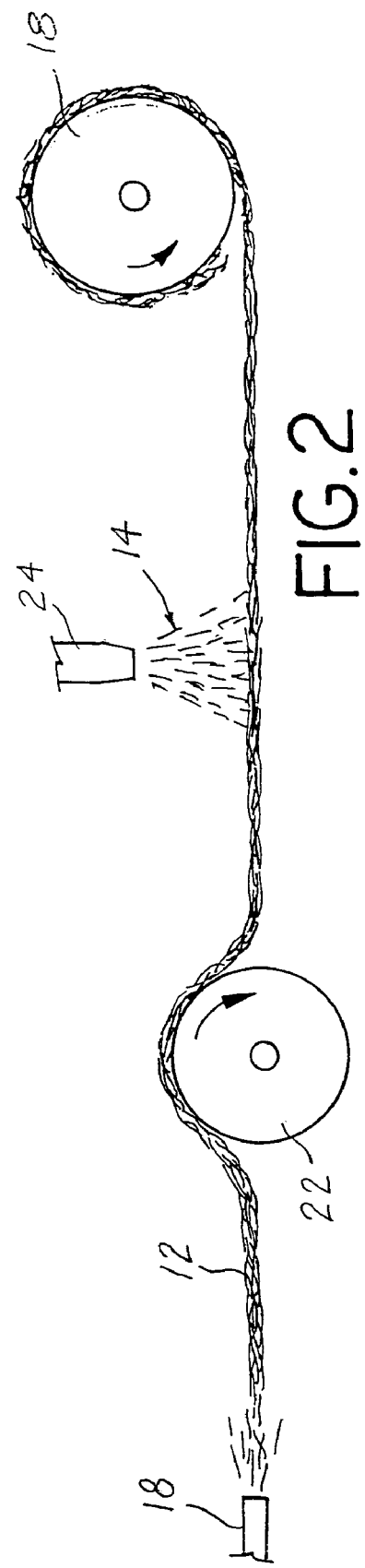
FIG. 2 is a side view showing the filtration unit of FIG. 1 being formed by a first process.
Figure 7:
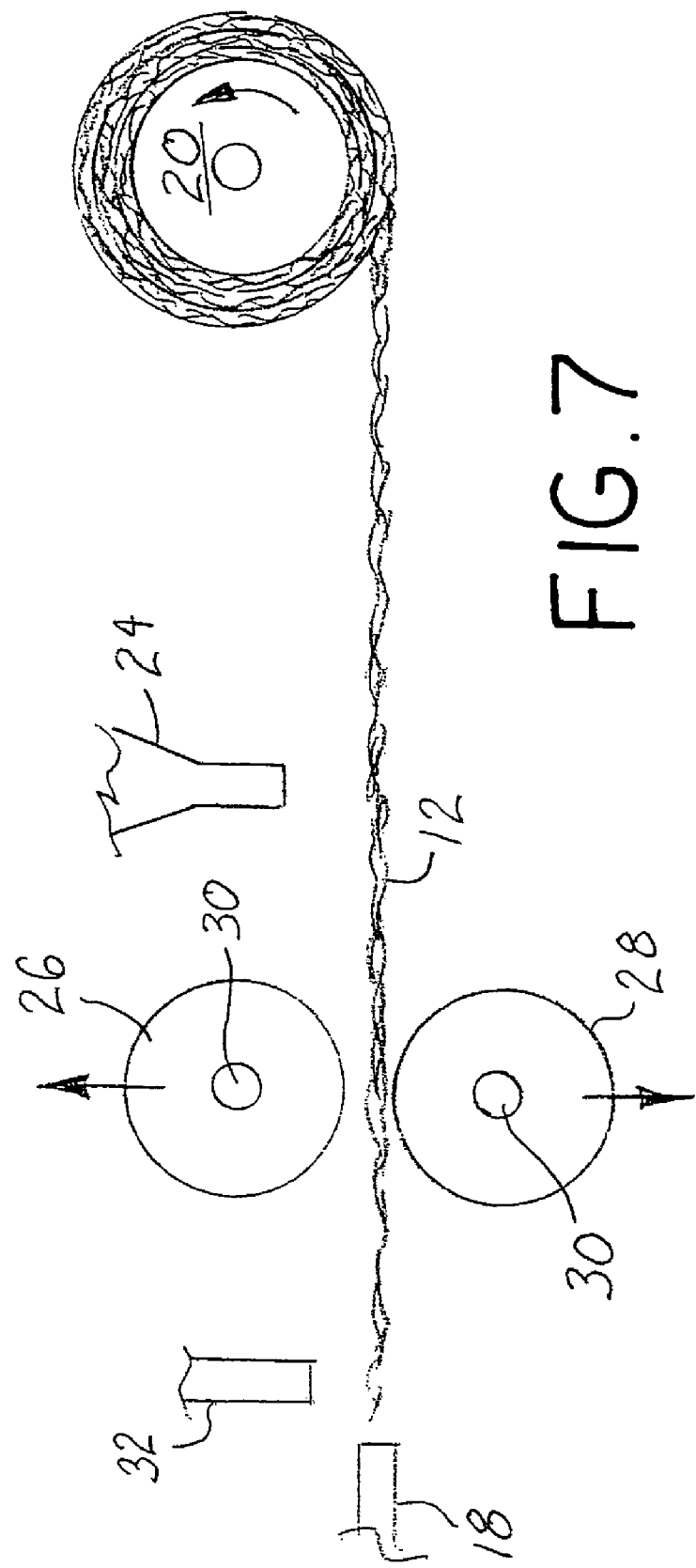

FIG. 2 illustrates a method of manufacturing the filtration unit of FIG. 1. An extrusion nozzle 18 and a mandrel 20 are provided. Normally in the manufacture of cartridge filters, liquefied, molded base material is blown from nozzle 18 into multiple elongated strands which are wound upon mandrel 20. As the strands in their heated form are wound about mandrel 20, there is intermittent adherence between the stands. This allows for the porous nature of the filtration unit. Once the desired thickness of the material upon mandrel 20 has been reached, flow of the stands of the material through nozzle 18 is terminated and the wound overlapping fibrous unit is removed from the mandrel. An elongated unit is then cut into longitudinal sections of desired length and appropriately packaged.

The path of the blown base material 12 is interrupted by being displaced laterally such as by means of roller 22. This displacement of the base material as it is emitted from nozzle 18 breaks or diverts the flow of air which accompanies the strands of base material. A dispensing nozzle 24 located between roller 22 and mandrel 20 deposits, such as by gravity or other means, active material 14 upon the strands of base material 12 in layered form. The controlled flow of the active material 14 as it is deposited upon the strands of base material is not disturbed or interrupted by the air flow from nozzle 18 due to the diversion of the strand of material caused by roller 22. The base material 12 with its layer of active material 14 is then wound upon mandrel 20 causing the active material to be captured between the adhering layers of the base material as they are cooled upon mandrel 20. Normally, the filtration unit 10 would be formed by first winding several layers of base material 12 upon the mandrel and thereafter introducing active material 14. Introduction of active material 14 upon the strands of the base material would be terminated just prior to reaching the final diameter of the filtration unit to allow several strands of only the base material to be wound upon the outer layer of the unit. In this manner the active material would be confined between pure layers of base material which base material could function as a pre-filter.

To package unit 10, which is of elongated cylindrical shape, shrink-wrapped plastic can be applied over the elongated cylindrical unit 10 prior to or subsequent to its removal from mandrel 20. Thereafter, once the unit has been removed from mandrel 20, it will be cut into specific lengths. In this manner the outside of the filtration unit will be maintained in a clean manner with no migration of the active material to the exterior of the unit.

Another method of manufacturing filtration unit 10 is illustrated in FIGS. 3–7. In this method, base material 12 is blown from nozzle 18 and wound around mandrel 20 as previously described. Instead of laterally only displacing the base material, however, a pair of opposing rollers 26, 28 are located on either side of the base material between nozzle 18 and mandrel 20. Rollers 26, 28 are preferably heated to maintain base material 12 in a warm, tacky condition for accepting active material 14 and its adhesion when being wound on the mandrel. In the depicted embodiment, a heated rod 30 centrally located through each roller 26, 28 is used to maintain the rollers at a desired temperature, but other methods of heating the rollers could also be used. Rollers 26, 28 are rotationally driven to match the speed of base material 12 as it passes between the rollers. Active material 14 is applied to base material 12 between rollers 26, 28 and mandrel 20. A gate 32 is shifted into the stream of the base material to disrupt base material 12 when a filtration unit 10 has been completed.

Initially, as illustrated in FIG. 3, a stream of base material 12 is blown from nozzle 18 between rollers 26, 28 while rollers 26, 28 are spaced apart from each other in an open position and wound onto mandrel 20 without adding any active material 14 so as to begin a pure layer of base material around the mandrel. Next, as illustrated in FIG. 4., with base material 14 continuing to be wound onto mandrel 20 from nozzle 18, rollers 26, 28 are urged toward each other to a closed position compressing the passing base material while rotating at the same speed as the base material. Rollers 26, 28 preferably travel a fixed path between their open and closed positions such that in their closed position they would just touch each other if no base material were being fed between them. After rollers 26, 28 are closed about the passing base material, active material 14 is applied to base material 12 from dispensing nozzle 24 on the lee side of rollers 26,28 as the base material passes to mandrel 20 as illustrated in FIGS. 5 and 6. In their closed position, rollers 26, 28 interrupt or block the air being blown from nozzle 18 thereby preventing the air from dispersing the active material 14 being applied from dispensing nozzle 24 and allowing a controlled application of the active material onto the passing base material. In this manner, active material 14 is interspersed between adjacent layers of wound base material 12. To finish forming filter unit 10, the flow of activation material 14 from dispensing nozzle 24 is stopped while a final layer of pure base material 12 is wound on the exterior of the filter unit as illustrated in FIG. 7. When unit 10 is fully formed, gate 32 is closed into the flow of base material 12 from nozzle 18 to disrupt the strands of the base material when filter unit 10 is complete. The finished unit 10 may then be covered and removed from the mandrel as herein before described.

The above subject invention is not to be limited to the details above given but may be modified within the scope of the appended claims.

We claim:

1. A method of manufacturing a filtration unit comprising the steps:

(a) providing a molten base material;

(b) propelling said base material through a nozzle between a pair of spaced apart rollers by air flow into elongated strands onto a mandrel;

(c) winding said strands upon said mandrel in an overlapping, self-adhering manner to form a filtration unit;

(d) closing said rollers about said strands to interrupt said air flow;

(e) depositing said active material upon said strands between said rollers and said mandrel while said rollers are closed about said strands.

2. The method of claim 1 and further comprising the step of heating as least one of said rollers.

* * * * *